United States Patent
Herman et al.

(10) Patent No.: US 11,914,745 B2
(45) Date of Patent: Feb. 27, 2024

(54) PERSONALLY IDENTIFIABLE INFORMATION IN ENCRYPTED DATA STREAMS

(71) Applicant: FORD GLOBAL TECHNOLOGIES, LLC, Dearborn, MI (US)

(72) Inventors: David Michael Herman, West Bloomfield, MI (US); Jon Speigle, Livonia, MI (US); Brian Tamm, Pleasant Ridge, MI (US); Yashanshu Jain, Dearborn, MI (US); Yogendra Singh, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 505 days.

(21) Appl. No.: 17/230,415

(22) Filed: Apr. 14, 2021

(65) Prior Publication Data
US 2022/0335153 A1    Oct. 20, 2022

(51) Int. Cl.
*G06F 21/62* (2013.01)
*G06N 3/08* (2023.01)
*G06N 3/04* (2023.01)
*G06V 20/56* (2022.01)
*G06V 40/16* (2022.01)
*G06V 20/62* (2022.01)

(52) U.S. Cl.
CPC .......... *G06F 21/6245* (2013.01); *G06N 3/04* (2013.01); *G06N 3/08* (2013.01); *G06V 20/56* (2022.01); *G06V 40/166* (2022.01); *G06V 40/169* (2022.01); *G06F 2221/2141* (2013.01); *G06V 20/625* (2022.01); *G06V 2201/07* (2022.01)

(58) Field of Classification Search
CPC .......... G06F 21/6245; G06F 21/6254
See application file for complete search history.

(56) References Cited

U.S. PATENT DOCUMENTS

| | | | |
|---|---|---|---|
| 7,724,918 B2 | 5/2010 | Balakrishnan et al. |
| 8,570,403 B2 | 10/2013 | Lee et al. |
| 8,620,038 B2 | 12/2013 | Aarabi |
| 8,712,189 B2 | 4/2014 | Bitouk et al. |
| (Continued) | | | |

OTHER PUBLICATIONS

D. Grimm, M. Stang and E. Sax, "Context-Aware Security for Vehicles and Fleets: A Survey," in IEEE Access, vol. 9, pp. 101809-101846, 2021. (Year: 2021).*

(Continued)

*Primary Examiner* — Kari L Schmidt
(74) *Attorney, Agent, or Firm* — Frank Lollo; Brooks Kushman P.C.

(57) ABSTRACT

Handling personally identifiable information (PII) in data streams is provided. Processed sensor data is received, from a plurality of vehicles including sensors capturing raw sensor data, the raw sensor data including captured PII and non-PII. The processed sensor data includes simulated PII created based on the captured PII and one or more layers of the captured PII corresponding to the simulated PII. A request is received from a client device for a portion of the processed sensor data. Access keys corresponding to the request are identified. A result is constructed according to the access keys using the processed sensor data. The constructed result is sent to the client device responsive to the request.

22 Claims, 8 Drawing Sheets

(56) References Cited

U.S. PATENT DOCUMENTS

| | | | |
|---|---|---|---|
| 9,858,699 B2 | 1/2018 | Gordon et al. | |
| 10,657,286 B2* | 5/2020 | Nambiar | G06F 21/6254 |
| 10,839,104 B2* | 11/2020 | Balzer | H04L 63/0421 |
| 10,990,695 B2* | 4/2021 | Kvochko | G11B 27/02 |
| 11,080,423 B1* | 8/2021 | Kassam-Adams | G16H 15/00 |
| 11,671,247 B2* | 6/2023 | Racz | H04L 9/30 |
| | | | 713/171 |
| 11,748,510 B1* | 9/2023 | Beveridge | G06F 21/6245 |
| | | | 726/27 |
| 2014/0176708 A1 | 6/2014 | Ramakrishnan et al. | |
| 2016/0294781 A1 | 10/2016 | Ninan et al. | |
| 2017/0111175 A1* | 4/2017 | Oberhauser | H04L 63/08 |
| 2019/0050592 A1* | 2/2019 | Grau | G06F 21/629 |
| 2019/0147709 A1* | 5/2019 | Schoner | G07G 1/009 |
| | | | 235/383 |
| 2019/0206101 A1 | 7/2019 | De la Torre et al. | |
| 2020/0285771 A1* | 9/2020 | Dey | G06F 21/6272 |
| 2021/0004486 A1* | 1/2021 | Adams | G06F 21/604 |
| 2021/0097201 A1* | 4/2021 | Wasicek | G06F 21/6254 |
| 2022/0021660 A1* | 1/2022 | Trieflinger | H04L 63/0414 |
| 2022/0076066 A1* | 3/2022 | Forgeat | G06N 3/047 |

OTHER PUBLICATIONS

Sowmya Myneni, Garima Agrawal, Yuli Deng, Ankur Chowdhary, Neha Vadnere, and Dijiang Huang. 2022. SCVS: On AI and Edge Clouds Enabled Privacy-preserved Smart-city Video Surveillance Services. ACM Trans. Internet Things 3, 4, Article 28 (Nov. 2022), 26 pages. (Year: 2022).*

A. Elmquist and D. Negrut, "Modeling Cameras for Autonomous Vehicle and Robot Simulation: An Overview," in IEEE Sensors Journal, vol. 21, No. 22, pp. 25547-25560, 15 Nov. 15, 2021. (Year: 2021).*

Sawhney, AI in Action: How to Automate the Boring Task of Blurring Car Number Plates for Sharing on Social Media, Medium, Dec. 29, 2019.

* cited by examiner

US 11,914,745 B2

1

PERSONALLY IDENTIFIABLE INFORMATION IN ENCRYPTED DATA STREAMS

TECHNICAL FIELD

Aspects of the disclosure relate to the handling of personally identifiable information (PII) in data streams.

BACKGROUND

PII includes many forms of information that could identify a human being. PII may include textual information such as names, addresses, and birth dates. PII may include other information as well, such as photographs of people, houses, license plates, biometrics, or health information. Data analytics may require the use of large sets of collected data. These data sets may include PII. Data streams may consist of both PII and non-PII data.

SUMMARY

In a first illustrative embodiment, a system for handling PII in data streams is provided. The system includes a sensor configured to capture raw sensor data, the raw sensor data including captured PII and non-PII. The system further includes a processor programmed to identify the PII in the raw sensor data, identify data attributes of the captured PII, generate simulated PII for the captured PII based on the data attributes using a generative adversarial network, construct processed sensor data including the simulated PII as a base layer and the captured PII as one or more encrypted additional layers, and send the processed sensor data to a remote server.

In a second illustrative embodiment, a system for handling PII in data streams is provided. The system includes a data store configured to maintain processed sensor data including simulated PII and one or more layers of actual PII corresponding to the simulated PII. The system further includes a processor programmed to receive a request from a client device for a portion of the processed sensor data, identify access keys corresponding to the request, construct a result according to the access keys using the processed sensor data, and send the constructed result to the client device responsive to the request.

In a third illustrative embodiment, a method for handling PII in data streams is provided. Processed sensor data is received from a plurality of vehicles including sensors capturing raw sensor data, the raw sensor data including captured PII and non-PII, the processed sensor data including (i) a base layer having the non-PII and simulated PII created based on the captured PII, (ii) one or more encrypted additional layers of the captured PII corresponding to the simulated PII, (iii) base metadata descriptive of the non-PII and the simulated PII, and (iv) encrypted PII metadata descriptive of the captured PII. A request from a client device is received for a portion of the processed sensor data. Access keys corresponding to the request are identified. A result is constructed according to the access keys using the processed sensor data. The constructed result is sent to the client device responsive to the request.

2

Figure 2:
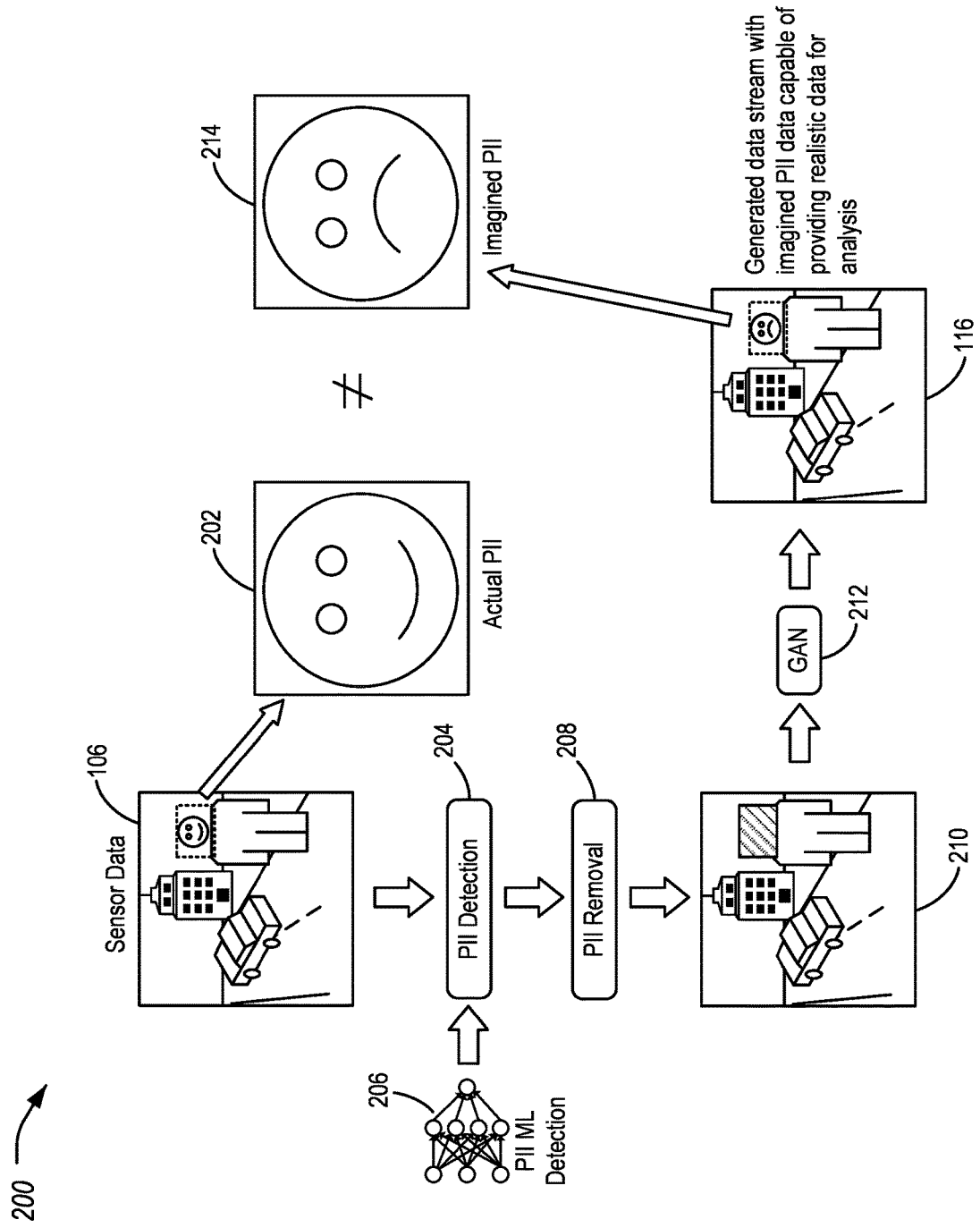
Figure 3:
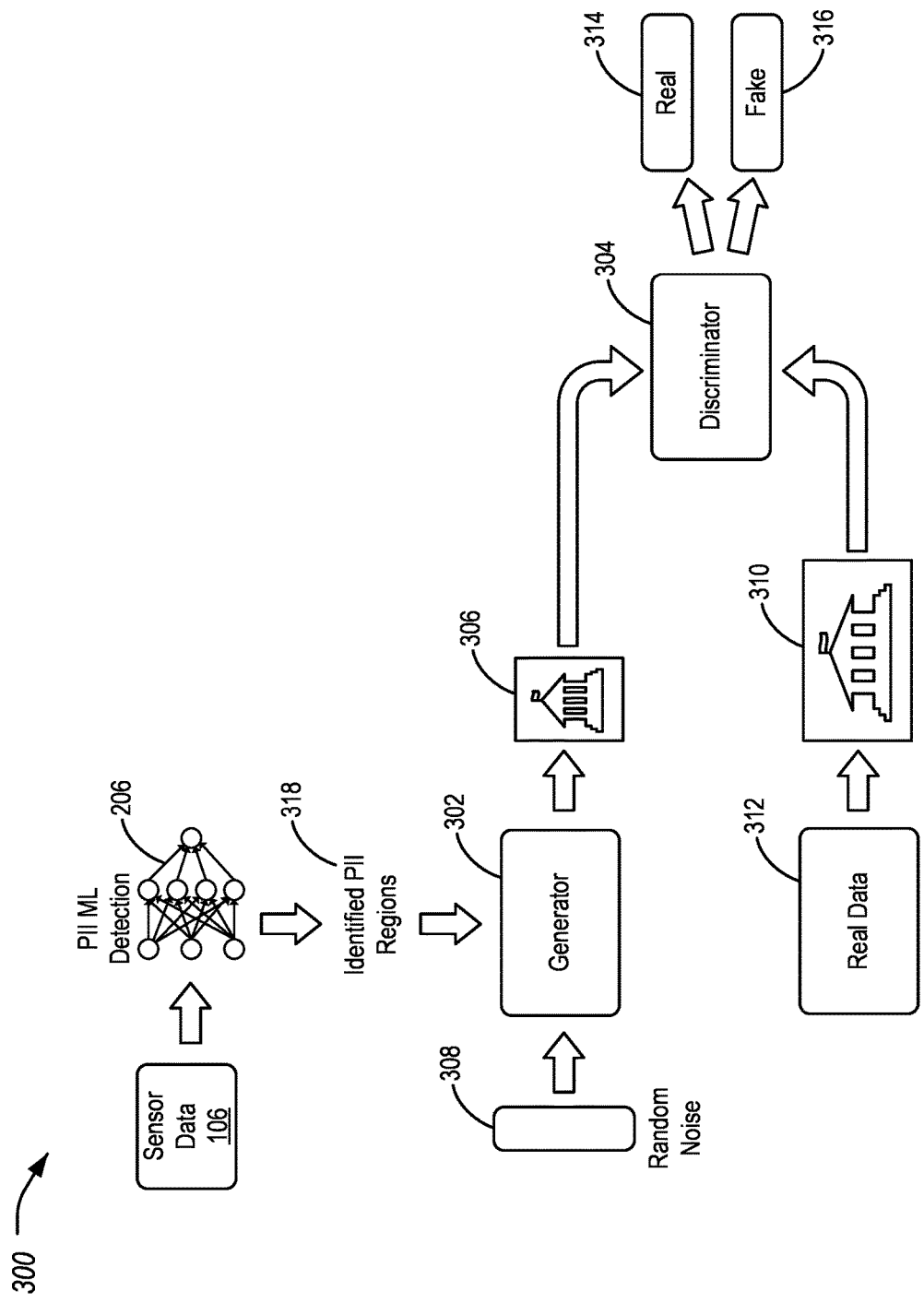
Figure 4:
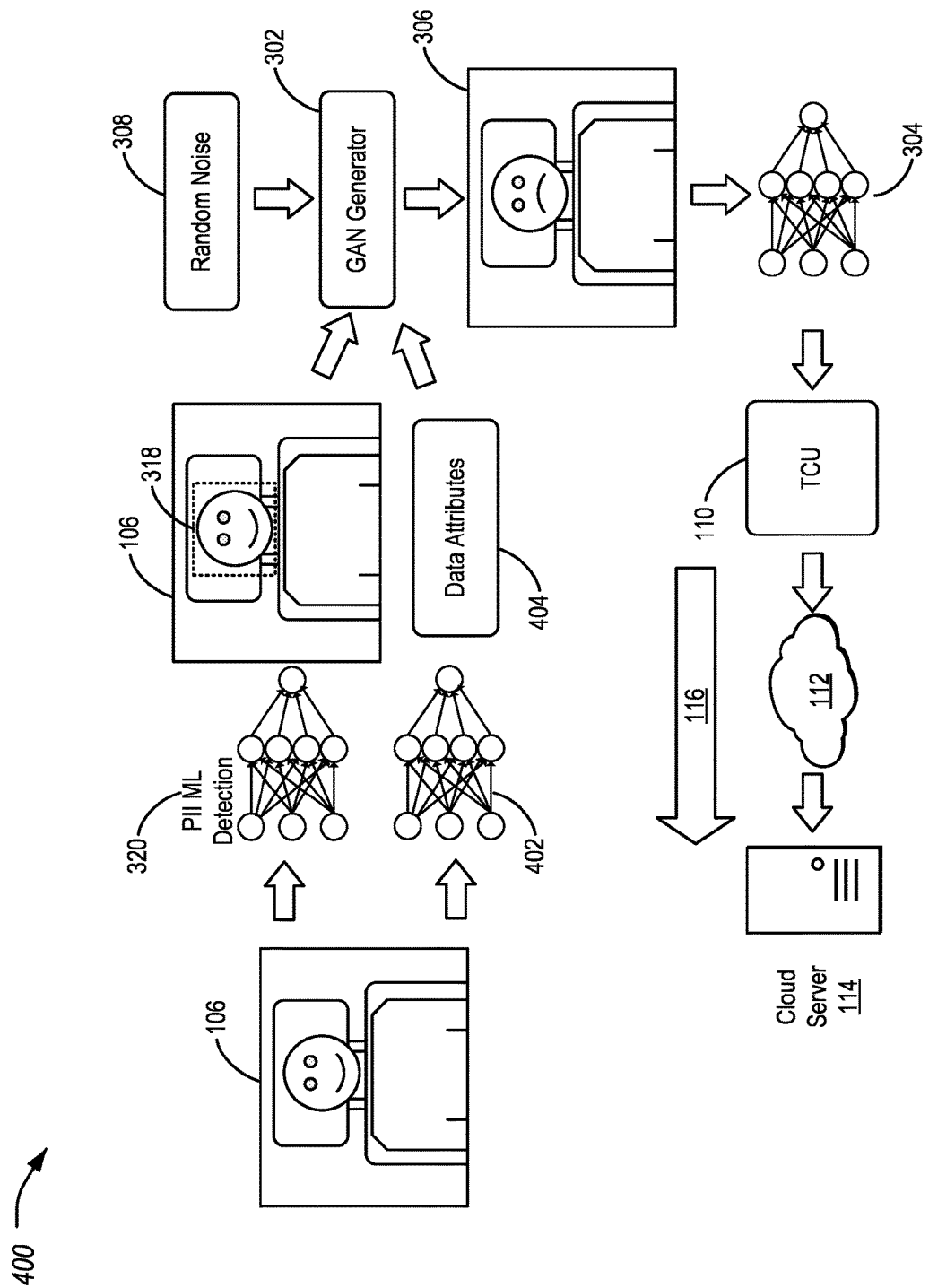
Figure 5:
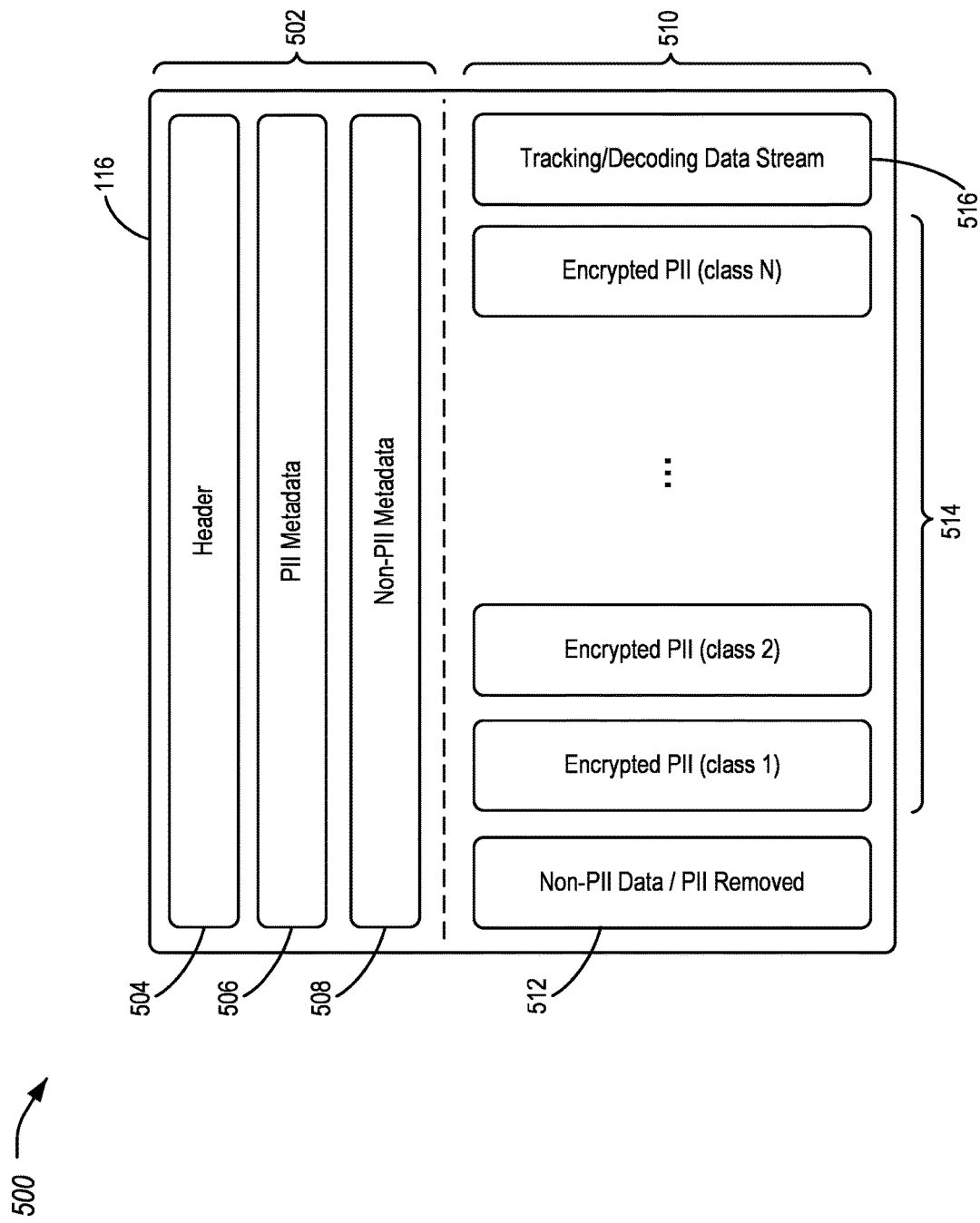
Figure 6:
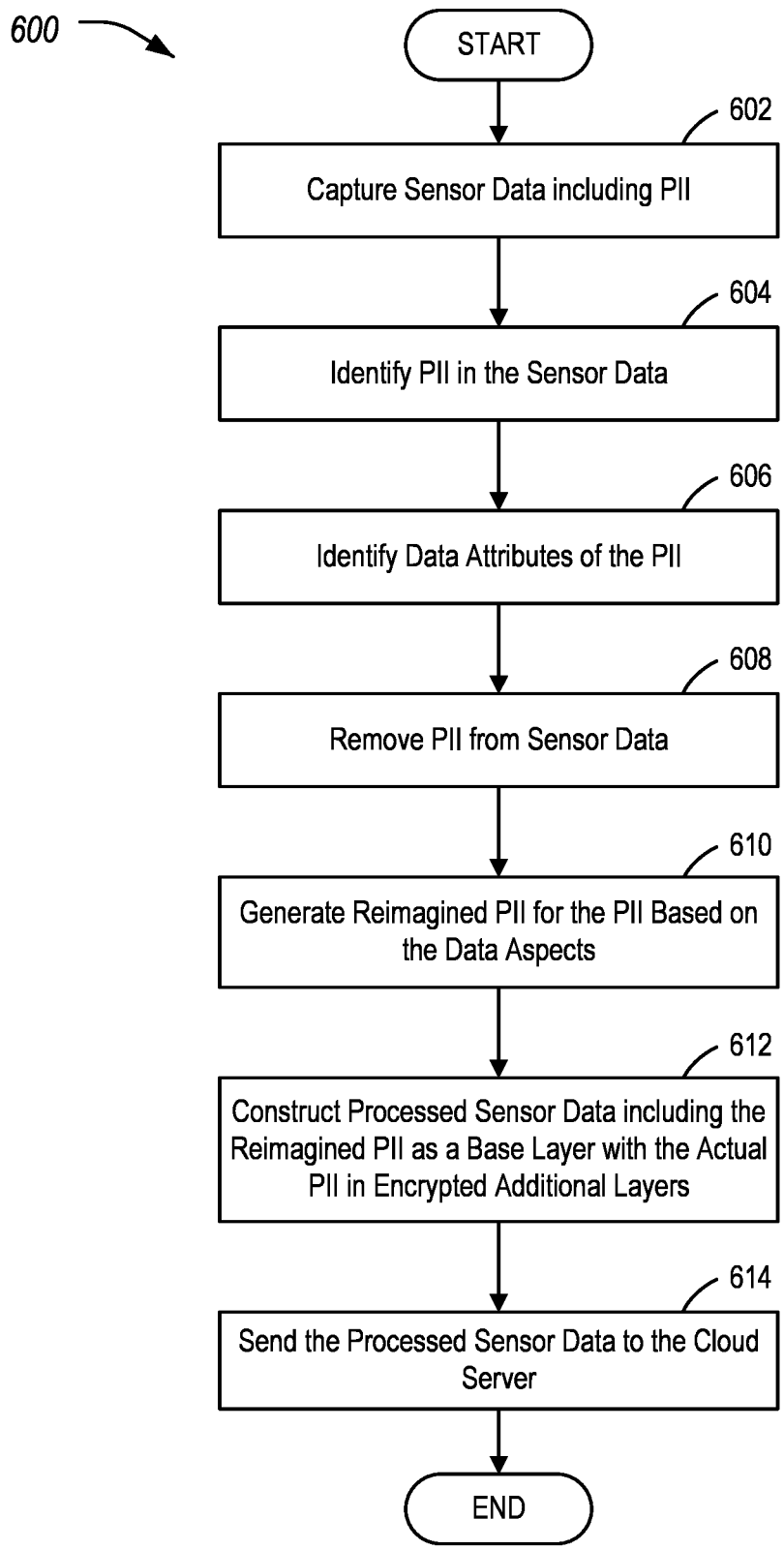
Figure 7:
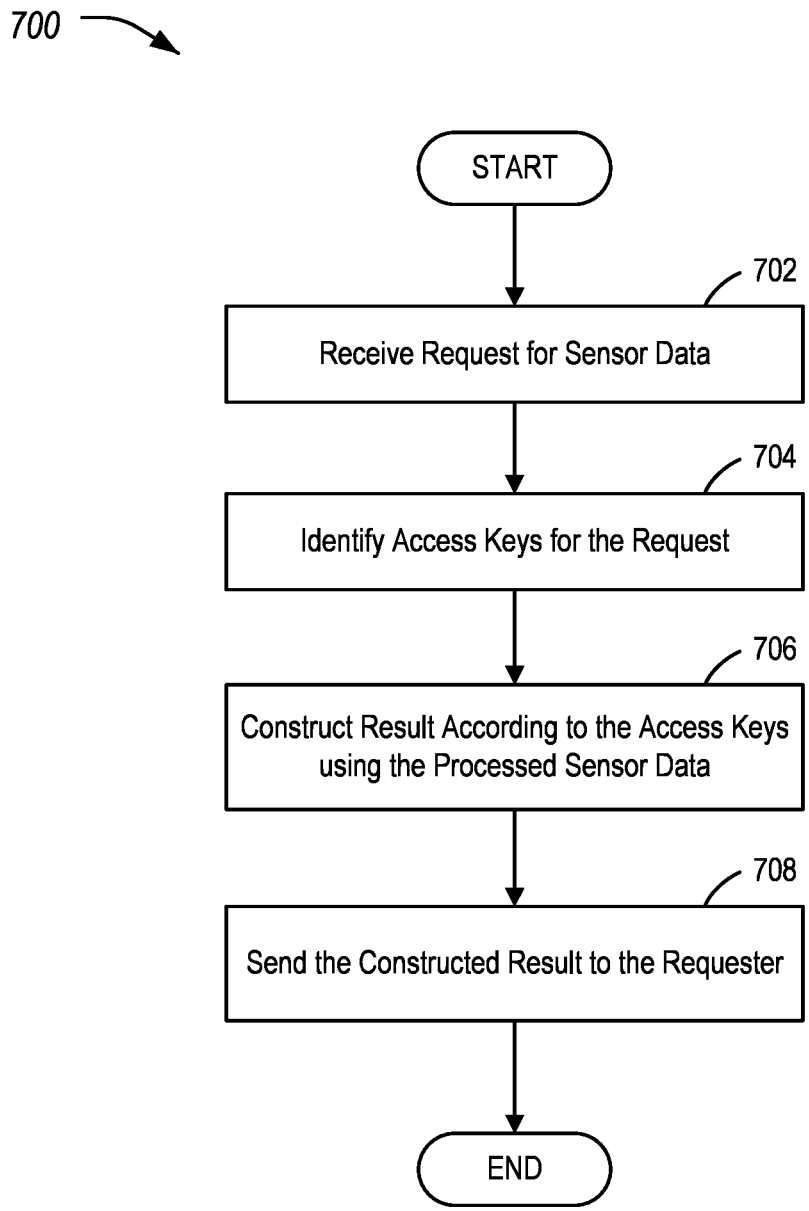
Figure 8:
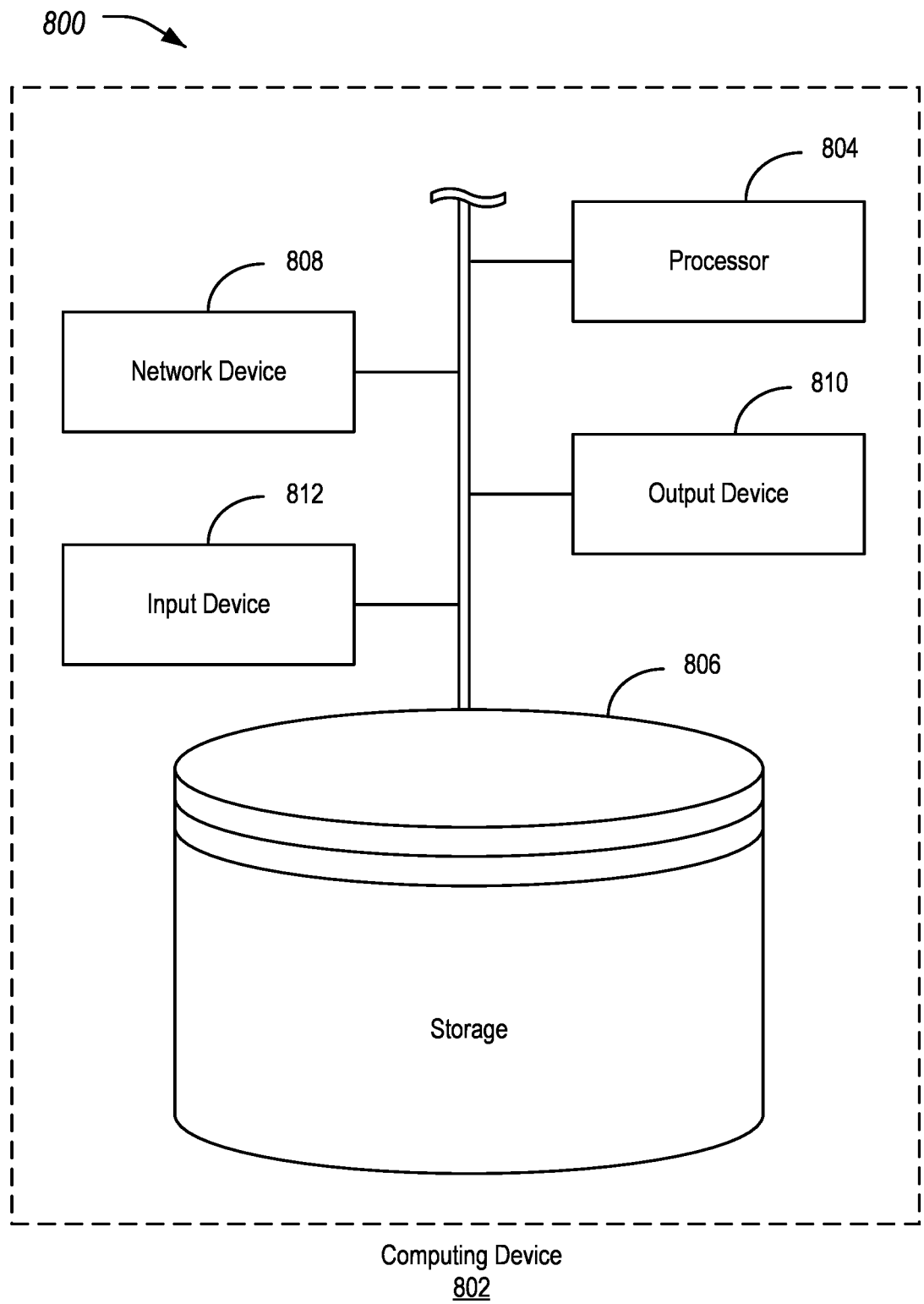

FIG. 2 illustrates an example data flow for the removal of PII from the sensor data;

FIG. 3 illustrates an example data flow for the generation of simulated PII with respect to sensor data of the surroundings of the vehicle;

FIG. 4 illustrates an example data flow for the generation of simulated PII with respect to sensor data of the interior of the vehicle;

FIG. 5 illustrates an example data format of the processed sensor data;

FIG. 6 illustrates an example process for the creation of processed sensor data;

FIG. 7 illustrates an example process for the querying of processed sensor data; and FIG. 8 illustrates an example of a computing device for the acquisition and handling of PII and non-PII data.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle sensors, such as cameras, may acquire both PII data and non-PII data. In some cases, raw data may be considered PII but processed data or metadata may be considered non-PII. For instance, raw data from a capacitive touch sensor on a steering wheel may be PII, as such data may include heartbeat data (e.g., heart rate, heart arrhythmia information). It is possible, however, that attributes determined based on that information may be non-PII. In other cases, raw data may not be PII but the processed data may be considered PII. For instance, driver inputs to a vehicle (e.g., driver behavior) from multiple systems may be used to identify a user with some level of accuracy (albeit in in some cases less accurately than direct techniques such as driver state monitoring camera images or vehicle identification number (VIN) information). This combination of the collection of human machine interface (HMI) interactions may be PII, which then may require steps to anonymize or obfuscate the driver behavior to reduce likelihood of identifying a user.

In a specific example, vehicles are increasingly being equipped with in-cabin cameras (e.g., for driver state monitoring). These cameras may capture PII of vehicle occupants. In another example, vehicles may include external cameras to provide data to driver assistance or autonomous driving vehicle systems. These cameras may capture PII of pedestrians or other individuals outside the vehicle. It should be noted that camera images are an example, and other data may be used, such as captured audio, location information, date and time information, vehicle control inputs, vehicle speed or other operational parameters, etc.

It may be useful to collect data to deliver features to customers, as well as to develop and debug the driver assistance or autonomous driving vehicle systems. For some events, it may be helpful to have the vehicle share collected vehicle data with a cloud service for providing features or for debugging the features. However, this sharing may raise PII and/or privacy issues. For instance, the transfer of this data may create compliance burdens with General Data Protection Regulation (GDPR) or other privacy rules. If the PII is simply removed from the image data, such as via blurring or redaction, then the image may no longer be useful for debugging purposes or for providing value to customers.

A generative adversarial network (GAN) may be used to create sensor data that appears realistic to both human and machine observers. In an example, the GAN may be used to generate simulated faces in captured image data. For instance, a face may be generated to appear realistic but be different than the original face in the data. The face may be generated to be comparable to the original pedestrian face image (e.g. according to convolutional neural network (CNN) pedestrian detection algorithm confidence, bounding box, facing direction, etc.) These simulated faces may be used to replace the actual faces captured in the images. The faces generated by the GAN may look comparable to real captured face images but may be computer generated and therefore not real. As the generated faces are not of real people, such images do not identify people and are therefore not PII. Moreover, such images may still be useful in delivering features to customers or in developing and debugging the driver assistance or autonomous driving vehicle systems, as the images may be comparable to actual data. Faces are one example, and the GAN may be used to generate other pieces of PII data, such as license plate images.

A customer may wish to store and access the PII and non-PII data stored in an original equipment manufacturer (OEM) cloud. A customer may also wish to provide access to others. It may further be desirable for some users to have access to the original data including the PII, while other users should instead have access to the non-PII with the simulated PII. A video data structure with multiple streams may be defined that contains non-PII and multiple PII classifications with separate encryption keys. A key server may be used to ensure proper access to the PII. This may reduce the possibility of a PII release. Further aspects of the disclosure are discussed in detail herein.

Figure 1:
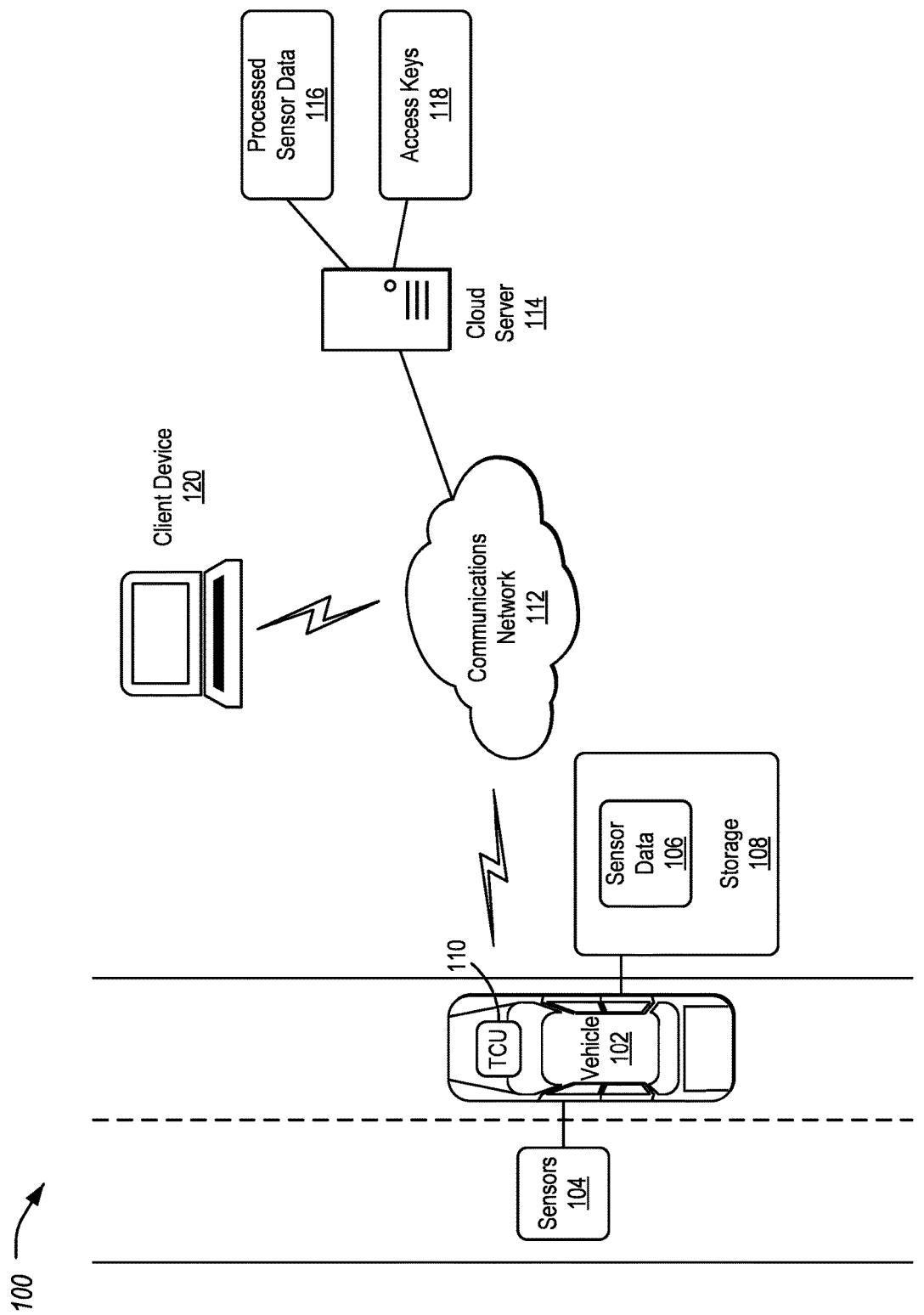
FIG. 1 illustrates an example system for the acquisition and handling of PII and non-PII data.

FIG. 1 illustrates an example system 100 for the acquisition and handling of PII and non-PII data. In such a system, a vehicle 102 may utilize one or more sensors 104 to capture sensor data 106 including PII and non-PII. The vehicle 102 may include a storage 108 configured to maintain the sensor data 106. The vehicle 102 may also include a telematics control unit (TCU) 110 configured to communicate over a communications network 112 with a cloud server 114. The cloud server 114 may maintain processed sensor data 116 as well as access keys 118 to grant access to aspects of the processed sensor data 116 to client devices 120. It should be noted that the system 100 is only an example, and systems 100 having more, fewer, or different elements may be used. For instance, while only one vehicle 102 and one client device 120 is shown, it is contemplated that systems 100 could include many vehicles 102 and/or many client devices 120. As another example, while only a single cloud server 114 is shown, it should be noted that implementations may include more than one server, for load balancing or other networking purposes. At yet a further example, instead of a vehicle 102, other devices that capture PII may be used, for instance, for security systems in general or for refrigerators or other household devices equipped with cameras.

The vehicle 102 may include various types of automobile, crossover utility vehicle (CUV), sport utility vehicle (SUV), truck, recreational vehicle (RV), boat, jeepney, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. Some vehicles 102 may be operator controlled, while other vehicles 102 may be autonomously or semi-autonomously controlled. Some vehicles 102 may also have internet-of-things (TOT) features such as remote sentry mode.

The sensors 104 may include various devices configured to capture sensor data 106 of the vehicle 102 environment, as the operation of the autonomous, semi-autonomous, TOT, and other features may require the use of such sensor data 106. In an example, the sensors 104 may include visible light cameras or infrared cameras configured to capture still images and/or video data. In another example, the sensors 104 may include sensors configured to determine three-dimensional (3D) information and/or relative velocities, such as RADAR sensors or LiDAR sensors. In another example, the sensors 104 may include sensors configured to measure contact force such as capacitive touch sensor. It should be noted that there may be other types of sensors 104 as well, such as global navigation satellite system (GNSS) location devices, audio capture devices, etc. The sensor data 106 may be stored to a database, memory, or other storage 108 of the vehicle 102. In some cases, the sensor data 106 may be stored as a snapshot in time. In some cases, the sensor data 106 may be stored as time series data. In some instances, the sensors 104 may be configured to capture sensor data 106 of the surroundings of the vehicle 102. For instance, the sensors 104 may be configured to generate sensor data 106 of the roadway, of other vehicles 102, of pedestrians, or of obstacles. This sensor data 106 may be useful for driver assistance system, for autonomous driving systems, for a security camera device, for dash camera applications, and/or for recording driving data for recreation (e.g., track days, taking a picture such as a car selfie). However, the capture of such sensor data 106 may involve the capture of PII. For instance, license plates of other vehicles may be captured in the sensor data 106. Faces of pedestrians may be captured in the sensor data 106 as another example. When combined with date/time and geo-location data, this sensor data 106 may be particularly concerning, as it may both identify a person and also a location and time where the person was.

Some sensors 104 may additionally or alternately be configured to capture sensor data 106 inside of the vehicle 102, such as of the vehicle 102 cabin. This sensor data 106 may be useful for applications such as driver awareness verification, vehicle occupancy detection, incident analysis, video conference, autonomous vehicle ride share applications, or to ensure that infants or belongings are not left behind in the vehicle 102. This sensor data 106 may also involve the capture of faces of vehicle occupants or other PII. It should be noted that this is only one example, and the sensor data may include captured audio, location information, date and time information, vehicle control inputs, vehicle speed or other operational parameters, etc.

The TCU 110 may be configured to provide telematics services to the vehicle 102. These services may include, as some non-limiting possibilities, navigation, turn-by-turn directions, vehicle health reports, local business search, accident reporting, and hands-free calling. This may also include other data-driven services mentioned herein, such as autonomous driving, semi-autonomous driving, etc. The TCU 110 may accordingly be configured to utilize a transceiver to communicate with a communications network 112.

The communications network 112 may provide communications services, such as packet-switched network services (e.g., Internet access, voice over Internet Protocol (VoIP) communication services), to devices connected to the communications network 112. An example of a communications network 112 is a cellular telephone network. For instance, the TCU 110 may access the cellular network via connection to one or more cellular towers. To facilitate the communications over the communications network 112, the TCU 110 may be associated with unique device identifiers (e.g., mobile device numbers (MDNs), Internet protocol (IP) addresses, etc.) to identify the communications of the TCU 110 on the communications network 112 as being associated with the vehicle 102.

The cloud server 114 may be a computing device configured to communicate with the vehicles 102 over the communications network 112. The cloud server 114 may be configured to receive processed sensor data 116 from the vehicles 102, as well as to maintain access keys 118 that allow the client devices 120 to access the processed sensor data 116. The access keys 118 may be configured to allow users to have access to different levels of information included within the processed sensor data 116. For instance, a first access key 118 may allow the user to have access to one subset of PII information in the processed sensor data 116 but not other PII information in the processed sensor data 116, while a second access key 118 may allow the user to have access to a different subset of PII in the processed sensor data 116.

In one example, the customer whose PII is captured may hold the access keys 118 for the greatest level of access. The customer may, for instance, have the ability via the access keys 118 to view his or her own PII or that of other people captured by the customer's sensors (e.g., for a sentry mode), but other parties may be unable to access the PII or provide it to another party.

Customers may benefit from the sensor data 106 being stored on the vehicle 102 or the cloud server 114 but may wish to control who obtains access to the data. There may also be ethical, legal, and regulatory restrictions around the data. For instance, some elements and/or sub-elements of the sensor data 106 may be allowable or not allowable to a given user under some specific set of circumstances. Control of the sensor data 106 as it relates to features and customer privacy is therefore desirable.

FIG. 2 illustrates an example data flow 200 for the removal of PII from the sensor data 106. As shown, the sensor data 106 includes an original data stream of sensor data 106. In the illustrated example, the sensor data 106 is a video stream from a camera sensor 104 capturing image data with respect to surroundings of the vehicle 102. A pedestrian is located in the video stream, and, in particular, the face of the pedestrian is visible in the video stream. This face image is shown in magnified detail at 202 and represents an instance of PII in the sensor data 106.

At operation 204, PII is detected in the sensor data 106. In an example, a PII neural network 206 configured to detect instances of PII in the sensor data 106 may be used to detect the PII regions. The PII neural network 206 may be trained to identify various aspects of PII. In an example, the PII neural network 206 may be configured to recognize faces in the sensor data 106. In another example, the PII neural network 206 may be configured to recognize license plates in the sensor data 106. In yet further examples, other sensor data (such as touch sensor data, vehicle location, etc.) alone or in combination may include detectable PII. In some examples, different PII neural network 206 may be trained to identify different classes of PII. Regardless of approach, the PII neural network 206 may be trained to identify the PII using a labeled data set of instances of PII in example sensor data 106. Once trained, the PII neural network 206 may be used to perform the identification task.

At operation 208, PII removal is performed on the sensor data 106. For instance, instances of PII located in the sensor data 106 may be blurred, blocked out, or otherwise made unintelligible. The result of the removal of the instances of PII is sanitized sensor data 210, as shown. While the sanitized sensor data 210 avoids disclosure of the PII, the resultant image is unsightly and jarring to a user and may not be useful for machine-learning or other applications.

At operation 212, the sanitized sensor data 210 is provided to a GAN. The sanitized sensor data 210 may be provided along with other features of the image that may be useful for vehicle feature development (e.g., a pedestrian detection confidence, bounding boxes around pedestrians or other detected objects, etc.). In general, GANs are algorithmic architectures that use multiple neural networks in competition with one another to generate new, synthetic instances of data that can pass for real data. In this application, the GAN may be configured to generate imagined PII capable of providing more realistic data for analysis. This imagined PII may be inserted back into the sanitized sensor data 210 to generate simulated sensor data 214.

FIG. 3 illustrates an example data flow 300 for the generation of simulated PII with respect to sensor data 106 of the surroundings of the vehicle 102. As shown, the GAN includes a generator 302 and a discriminator 304. The generator 302 may be a first neural network configured to generate new instances of simulated PII 306. In order to create the instances of simulated PII-type data, the generator 302 may be configured to receive a random noise vector 308 from a source of random numbers (e.g., fed from an entropy pool).

The discriminator 304 may be a second neural network configured to receive the instances of simulated PII 306 generated by the generator 302 and evaluate those instances against training PII images 310 from a PII training data set 312 representing real images. Based on these inputs, the discriminator 304 may determine whether the simulated PII 306 is acceptable for use. If so, then the discriminator 304 indicates that the simulated PII 306 may be indicated as being real 314. If not, then the discriminator 304 indicates that the simulated PII 306 may be indicated as being fake 316. In an example, the discriminator 304 returns probabilities (e.g., as a number between 0 and 1, with 1 representing a prediction of authenticity and 0 representing a fake or unauthentic image). A threshold value may then be applied to the output to determine whether an instance of simulated PII 306 is acceptably real 314.

In some examples, additional inputs may be provided to the generator 302. For instance, the generator 302 may receive PII regions 318 or other information indicative of locations of PII within the sanitized sensor data 210 in which PII is to be generated. This information may be identified by the PII neural network 206 configured to detect instances of PII in the sensor data 106. Use of the PII regions 318 may allow the generator 302 to more easily generate instances of simulated PII 306 that are consistent with the surroundings of the sanitized sensor data 210. Other information may be fed into both the generator 302 and discriminator 304, such as 3D bounding box orientation, so that the generated output looks more real, thereby allowing computer vision or other machine-learning (ML) algorithms to predict similar output values from both real and simulated output. E.g. a different pedestrian face may be shown but with the same orientation in 3D space as the actual face, etc. It should also be noted that additional loss functions may be used to avoid producing PII that appears too similar to that which was removed.

FIG. 4 illustrates an example data flow 400 for the generation of reimagined PII with respect to sensor data 106 of the interior of the vehicle 102. Similar to the data flow 300, in the data flow 400, sensor data 106 is captured of the vehicle 102 cabin using the sensors 104. This sensor data 106 may include PII, such as the faces of vehicle 102 occupants.

The sensor data 106 may be provided to a PII neural network 320 to identify PII regions 318 within the sensor data 106, an example of which is shown. Additionally, a use-case-specific neural network 402 may be used to identify data attributes 404 of the sensor data 106. For instance, for face PII, the use-case-specific neural network 402 may be configured to identify information such as eye gaze, head pose, and gesture recognition.

The PII regions 318 and the data attributes 404 may be provided to the generator 302, along with the random noise vector 308, to facilitate the generation of the simulated PII 306. The PII regions 318 may be used to allow the generator 302 to determine the regions in which to generate the simulated PII 306. The data attributes 404 may be further used to guide aspects of the generation of the simulated PII 306. For instance, if the sensor data 106 indicates a head is tilted a particular way and/or eyes are directed in a particular direction, that information may be provided to the generator 302 to facilitate the generation of simulated PII 306 having those same data attributes 404. Thus, while the actual PII may be reimaged and not real, aspects of the underlying sensor data 106 may still be gleaned from the simulated PII 306.

As with the data flow 300, the simulated PII 306 may be evaluated by the discriminator 304, and if passing, may be provided to the TCU 110 for sending over the communications network 112 to the cloud server 114 for storage.

In another example, for license plate PII, the use-case-specific neural network 402 may be configured to identify information such as what state/province/country/etc. the license plate is for. In another example, for a license plate, a license plate may be generated for the same state as the PII, but with an unrelated license plate number. In an example, a random license plate number may be generated. In another example, a known fake license plate number may be used, as the randomly generated number may actually belong to actual user. (It should be noted that this approach could also be used for face generation, e.g., generating the same user face as opposed to a random face.)

FIG. 5 illustrates an example 500 data format of the processed sensor data 116. As shown, the processed sensor data 116 includes a static payload 502 including a header 504, non-PII metadata 508, and PII metadata 506. The processed sensor data 116 further includes a temporal payload 510 including non-PII sensor data 512, encrypted PII 514 of various classes, and tracking data 516 indicating where in the non-PII sensor data 512 the encrypted PII 514 may be included.

The header 504 may include information such as an indication of the format version of the processed sensor data 116. The PII metadata 506 may include information descriptive of the actual processed sensor data 116, such as an identifier of a user of the vehicle 102 when the processed sensor data 116 was captured, an identifier of the vehicle 102 from the processed sensor data 116 was captured, a location of the vehicle 102 when the processed sensor data 116 was captured, etc. To ensure data privacy, the PII metadata 506 may be encrypted using the access keys 118. The non-PII metadata 508 may include information indicative of the base version of the processed sensor data 116 without any PII. This may include for example, generalized or otherwise sanitized metadata from the PII metadata 506. For instance, locations may be generalized to the closest mile or postal code, vehicle identifiers may be generalized to vehicle model, etc.

The non-PII sensor data 512 may include a base version of the processed sensor data 116 without any PII. The non-PII sensor data 512 may be accessed with a lowest level of permission. The non-PII sensor data 512 may include the simulated sensor data 214, as opposed to the actual PII. This may allow for a consumer of the non-PII sensor data 512 to have a realistic-looking data source, without giving away any actual PII. In fact, the consumer (e.g., Software-in-the-Loop (SIL), Hardware-in-the-Loop (HIL), an individual, etc.) may not even be aware that the PII has been replaced in the non-PII sensor data 512 with generated content. In one example, the non-PII sensor data 512 may be accessible without any access keys 118.

The encrypted PII 514 may include the actual PII that was in the original sensor data 106. The encrypted PII 514 may be maintained as a layer that may be overlaid on a portion of the non-PII sensor data 512 to replace the PII back into the non-PII sensor data 512. In an example, each layer may be accessible through use of a different corresponding access key 118. In some implementations, different access keys 118 may be used to correspond to different classes of PII. For instance, a first access key 118 may be used for face PII, while a second access key 118 may be used for license plate numbers. In some implementations, different access keys 118 may be used for different time segments of the non-PII sensor data 512 or for different specific instances of the non-PII sensor data 512. This may be done, for instance, if there is a desire to share only a specific timeframe of the PII data with a requester, but not all PII of that particular class for the entire file of processed sensor data 116. Similarly, the same access keys 118 used to encrypt the encrypted PII 514 may also be used to encrypt the PII metadata 506 associated with the encrypted PII 514.

The tracking data 516 may include information indicative of where to replace the encrypted PII 514 back into the non-PII sensor data 512. This may be used to reassemble the portions of the PII back into the sensor data 106 in accordance with the access granted to the consumer via the access keys 118 provided by the consumer.

FIG. 6 illustrates an example process 600 for the creation of processed sensor data 116. In an example, the process 600 may be performed by the vehicle 102 in the context of the system 100. It should be noted that while the process 600 is illustrated linearly, one or more operations of the process 600 may be performed concurrently, and the process 600 may be performed continuously or in a loop wise manner.

At operation 602, the vehicle 102 captures sensor data 106 including PII. In an example, the vehicle 102 may receive sensor data 106 from the sensors 104 configured to generate sensor data 106 of the roadway, other vehicles 102, pedestrians, or obstacles. In another example, some sensors 104 may additionally or alternately be configured to capture sensor data 106 inside of the vehicle 102, such as of the vehicle 102 cabin.

At operation 604, the vehicle 102 identifies the PII in the sensor data 106. In an example, the vehicle 102 may use one or more PII neural networks 320 to identify PII in the sensor data 106. In an example, the PII neural network 320 may be configured to recognize faces in the sensor data 106. In another example, the PII neural network 320 may be configured to recognize license plates in the sensor data 106. In some examples, different PII neural network 320 may be trained to identify different types of PII.

At operation 606, the vehicle 102 identifies data attributes 404 of the PII. For instance, for face PIT, the use-case-specific neural network 402 may be configured to identify information such as eye gaze, head pose, and gesture recognition. In another example, for license plate PII, the use-case-specific neural network 402 may be configured to identify information such as what state the license plate is for.

At operation 608, the vehicle 102 removes the PII from the sensor data 106. For instance, the instances of PII located in the sensor data 106 at the PII regions 318 as identified using the PII neural networks 320 may be blurred, blocked out, or otherwise made unintelligible. This removal may be done for a snapshot of the sensor data 106 in some examples. In other examples, this removal may be done across a time series of sensor data 106. The result of the removal of the instances of PII is the sanitized sensor data 210.

At operation 610, the vehicle 102 generates simulated sensor data 214 for the PII based on the data attributes 404. For instance, the vehicle 102 may generate a face using the same as gaze and pose as a face in the sensor data 106. In another example, the vehicle 102 may generate a license plate with a different number but the same state as a license plate in the sensor data 106. In another example, the vehicle 102 may generate a capacitive touch sensor time series data with a different heart rate but the same hand pressure applied on the steering wheel over time in the sensor data 106. This simulated PII 306 may be incorporated back into the sanitized sensor data 210 at the PII regions 318 where PII was previously, to create the non-PII sensor data 512.

At operation 612, the vehicle 102 constructs processed sensor data 116 including the simulated sensor data 214 as a base layer with the actual PII in additional layers. For instance, the vehicle 102 may add header 504 information to the processed sensor data 116 including one or more of a format version of the processed sensor data 116, an identifier of a user of the vehicle 102 when the processed sensor data 116 was captured, an identifier of the vehicle 102 from the processed sensor data 116 was captured, a location of the vehicle 102 when the processed sensor data 116 was captured. The vehicle 102 may further include the non-PII sensor data 512 as the base version of the processed sensor data 116. The vehicle 102 may also include the actual PII that was in the original sensor data 106 as encrypted PII 514 layers that may be overlaid on the non-PII sensor data 512 to replace the PII back into the non-PII sensor data 512. The encrypted PII 514 may be encrypted using access keys 118 that correspond to different classes of PII (e.g., face, license plate, etc.), instance of PII (e.g., an element of PII, a vehicle 102 in the processed sensor data 116, a user in the processed sensor data 116), and/or time period (e.g., a day, an hour, a key cycle of the vehicle 102). The vehicle 102 may also include tracking data 516 in the processed sensor data 116 to maintain information indicative of where to replace the encrypted PII 514 back into the non-PII sensor data 512. This may be used to reassemble the portions of the PII back into the sensor data 106 in accordance with the access granted to the consumer via the access keys 118 provided by the consumer.

At operation 614, the vehicle 102 sends the processed sensor data 116 to the cloud server 114. The cloud server 114 may accordingly make the processed sensor data 116 available for querying by the client devices 120. After operation 614, the process 600 ends. It should be noted that the processing may run in the background indefinitely on the vehicle 102 on data segments as they are captured (e.g., for sentry mode).

FIG. 7 illustrates an example process 700 for the querying of processed sensor data 116. In an example, the process 700 may be performed by a client device 120 in the context of the system 100. It should be noted that while the process 700 is illustrated linearly, one or more operations of the process 700 may be performed concurrently, and the process 700 may be performed concurrently responsive to multiple requests from client devices 120.

At operation 702, the cloud server 114 receives a request for processed sensor data 116 from a client device 120. In an example, the client device 120 may send a request for information with respect to developing and debugging driver assistance or autonomous driving systems. In another example, the client device 120 may send a request for information with respect to a DTC. In another example, a vehicle owner or fleet operator may request video data from the vehicle which would be streamed through the cloud server 114.

At operation 704, the cloud server 114 identifies access keys 118 for the request. In one example, the client device 120 may include one or more access keys 118 in the request, where the access keys 118 provide permission to classes of PII to be included in the result, and/or times for which the PII is to be included in the result. In another example, access rights for the client device 120 may be determined based on rights or privileges of an account of the client device 120, independent of whether access keys 118 are included in the request.

At operation 706, the cloud server 114 constructs a result according to the access keys 118 using the processed sensor data 116. In an example, the cloud server 114 may access the processed sensor data 116 to retrieve the non-PII sensor data 512, and then, using the tracking data 516, may overlay on the non-PII sensor data 512 any of the encrypted PII 514 that is accessible to the user pursuant to the access keys 118 identified at operation 704. In some examples, the encrypted PII 514 in the result may be decrypted, while in other examples, the encrypted PII 514 may remain encrypted for decryption by the client device 120.

At operation 708, the cloud server 114 sends the constructed result to the client device 120. After operation 708, the process 700 ends. Accordingly, by using the process 700, the client device 120 may receive a version of the sensor data 106 including all PII to which the client device 120 has access, and replaced generated content for the PII to which the client device 120 does not have access. For some types of data, such as image portions, this may be done transparently, so the client device 120 is unaware of which information is reimagined and which is the true data. Moreover, as the data attributes 404 are used to regenerate the PII in anonymized form but with key aspects of the actual PII, the reimagined images may still be useful for various tasks, while still protecting user privacy.

FIG. 8 illustrates an example 800 of a computing device 802 for the acquisition and handling of PII and non-PII data. Referring to FIG. 8, and with reference to FIGS. 1-7, the TCU 110, cloud server 114, and client devices 120, may be examples of such computing devices 802. As shown, the computing device 802 includes a processor 804 that is operatively connected to a storage 806, a network device 808, an output device 810, and an input device 812. It should be noted that this is merely an example, and computing devices 802 with more, fewer, or different components may be used.

The processor 804 may include one or more integrated circuits that implement the functionality of a central processing unit (CPU) and/or graphics processing unit (GPU). In some examples, the processors 804 are a system on a chip (SoC) that integrates the functionality of the CPU and GPU. The SoC may optionally include other components such as, for example, the storage 806 and the network device 808 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or Microprocessor without Interlocked Pipeline Stage (MIPS) instruction set families.

Regardless of the specifics, during operation the processor 804 executes stored program instructions that are retrieved from the storage 806. The stored program instructions, accordingly, include software that controls the operation of the processors 804 to perform the operations described herein. The storage 806 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally 3D graphics to the output device 810. The output device 810 may include a graphical or visual display device, such as an electronic display screen, projector, printer, or any other suitable device that reproduces a graphical display. As another example, the output device 810 may include an audio device, such as a loudspeaker or headphone. As yet a further example, the output device 810 may include a tactile device, such as a mechanically raisable device that may, in an example, be configured to display braille or another physical output that may be touched to provide information to a user.

The input device 812 may include any of various devices that enable the computing device 802 to receive control input from users. Examples of suitable input devices that receive human interface inputs may include keyboards, mice, trackballs, touchscreens, voice input devices, graphics tablets, and the like.

The network devices 808 may each include any of various devices that enable the TCU 110, cloud server 114, and client devices 120 to send and/or receive data from external devices over networks. Examples of suitable network devices 808 include an Ethernet interface, a Wi-Fi transceiver, a cellular transceiver, or a BLUETOOTH or BLUETOOTH Low Energy (BLE) transceiver, ultra-wideband (UWB) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for handling personally identifiable information (PII) in data streams comprising:
    a data storage device configured to maintain processed sensor data including (i) a base layer having non-PII and simulated PII created based on captured PII in raw sensor data, (ii) one or more encrypted additional layers of the captured PII corresponding to the simulated PII, (iii) base metadata descriptive of the non-PII and the simulated PII, and (iv) encrypted PII metadata descriptive of the captured PII, the simulated PII being generated by identifying the captured PII in the raw sensor data, identifying data attributes of the captured PII, generating the simulated PII for the captured PII based on the data attributes using a generative adversarial network, and constructing the processed sensor data including the simulated PII in the base layer replacing the captured PII with the captured PII included in the one or more encrypted additional layers; and a processor programmed to
receive a request from a client device for a portion of the processed sensor data, identify access keys corresponding to the request,
construct a result according to the access keys using the processed sensor data, and send the constructed result to the client device responsive to the request.

2. The system of claim 1, wherein the access keys include an access key corresponding to faces of individuals in the processed sensor data, and the processor is further programmed to:
access the processed sensor data to retrieve the simulated PII, the simulated PII including simulated faces of the individuals;
access the processed sensor data to retrieve a layer of the actual PII corresponding to the faces of the individuals in the processed sensor data; and
construct the result including to overlay the faces from the actual PII over the faces from the simulated PII.

3. The system of claim 1, wherein the access keys include an access key corresponding to actual license plate images in the processed sensor data, and the processor is further programmed to:
access the processed sensor data to retrieve the simulated PII, the simulated PII including simulated license plate images;
access the processed sensor data to retrieve a layer of the actual PII corresponding to the actual license plate images in the processed sensor data; and
construct the result including to overlay the actual license plate images over the simulated license plate images.

4. The system of claim 1, wherein no access keys correspond to the request, and the result includes only the simulated PII without any of the actual PII.

5. The system of claim 1, wherein the access keys are included in the request.

6. The system of claim 1, wherein the access keys are determined based on rights of an account of the client device sending the request.

7. The system of claim 1, further comprising:
a sensor configured to capture the raw sensor data, the raw sensor data including the captured PII and non-PII; and
a second processor programmed to
identify the PII in the raw sensor data,
identify the data attributes of the captured PII,
generate the simulated PII for the captured PII based on the data attributes using the generative adversarial network,
construct the processed sensor data including the simulated PII as the base layer and the captured PII as the one or more encrypted additional layers, and
send the processed sensor data to the data storage device.

8. The system of claim 7, wherein the second processor is further programmed to identify the captured PII using one or more neural networks trained to identify the captured PII in the raw sensor data.

9. The system of claim 8, wherein the one or more neural networks includes a neural network configured to identify faces in the raw sensor data.

10. The system of claim 8, wherein the one or more neural networks includes a neural network configured to identify license plates in the raw sensor data.

11. The system of claim 7, wherein the second processor is further programmed to:
identify the data attributes in the captured PII using one or more use-case-specific neural networks configured to identify attributes of a class of PII independent of user-identification; and
use the attributes of the class of PII as an input to the generative adversarial network to cause the generative adversarial network to generate the simulated PII as randomly generated sensor data having the identified attributes.

12. The system of claim 11, wherein the one or more use-case-specific neural networks include a use-case-specific neural network configured to identify eye gaze and head position of faces in the raw sensor data.

13. The system of claim 11, wherein the one or more use-case-specific neural networks include use-case-specific neural network configured to identify a municipality corresponding to license plates in the raw sensor data.

14. The system of claim 7, wherein the second processor is further programmed to:
encrypt a first time period of captured PII using a first access key; and
encrypt a second time period of captured PII using a second access key.

15. The system of claim 7, wherein the second processor is further programmed to:
encrypt a first class of captured PII using a first access key; and
encrypt a second class of captured PII using a second access key.

16. The system of claim 7, wherein the raw sensor data includes images captured of a cabin of a vehicle.

17. The system of claim 7, wherein the raw sensor data includes images captured of an environment surrounding a vehicle.

18. A method for handling personally identifiable information (PII) in data streams, comprising:
receiving processed sensor data from a plurality of vehicles including sensors capturing raw sensor data, the raw sensor data including captured PII and non-PII, the processed sensor data including (i) a base layer having the non-PII and simulated PII created based on the captured PII, (ii) one or more encrypted additional layers of the captured PII corresponding to the simulated PII, (iii) base metadata descriptive of the non-PII and the simulated PII, and (iv) encrypted PII metadata descriptive of the captured PII, the simulated PII being generated by identifying the captured PII in the raw sensor data, identifying data attributes of the captured PII, generating the simulated PII for the captured PII based on the data attributes using a generative adversarial network, and constructing the processed sensor data including the simulated PII in the base layer replacing the captured PII with the captured PII included in the one or more encrypted additional layers;
receiving a request from a client device for a portion of the processed sensor data;
identifying access keys corresponding to the request;
constructing a result according to the access keys using the processed sensor data; and
sending the constructed result to the client device responsive to the request.

19. The method of claim 18, further comprising:
identifying the captured PII using a neural network configured to identify raw faces in the raw sensor data;

using a use-case-specific neural network to identify data attributes including eye gaze and head position of the raw faces in the raw sensor data;

generating simulated faces for the raw faces using the data attributes as an input to a generative adversarial network;

replacing the raw faces with the simulated faces in the raw sensor data to form the base layer; and encrypting the faces in the captured PII using an access key corresponding to PII face data to form one of the one or more encrypted additional layers.

20. The method of claim 19, further comprising:

identifying that one of the access keys corresponding to the request is the access key corresponding to the PII face data;

accessing the processed sensor data to retrieve the base layer having the non-PII and the simulated PII;

accessing the one or more encrypted additional layers of the captured PII corresponding to the simulated PII; and constructing the result including to overlay the faces from the captured PII over the faces from the simulated PII.

21. The method of claim 20, further comprising:

identifying that one of the access keys corresponding to the request is an access key corresponding to a time period;

accessing the processed sensor data to retrieve the base layer having the non-PII and the simulated PII;

accessing the one or more encrypted additional layers of the captured PII corresponding to the time period; and constructing the result including to overlay the captured PII over the simulated PII for the time period.

22. A non-transitory computer readable medium comprising instructions for handling personally identifiable information (PII) in data streams that, when executed by one or more processors, cause the one or more processors to perform operations including to:

receive processed sensor data from a plurality of vehicles including sensors capturing raw sensor data, the raw sensor data including captured PII and non-PII, the processed sensor data including (i) a base layer having the non-PII and simulated PII created based on the captured PII, (ii) one or more encrypted additional layers of the captured PII corresponding to the simulated PII, (iii) base metadata descriptive of the non-PII and the simulated PII, and (iv) encrypted PII metadata descriptive of the captured PII, the simulated PII being generated by identifying the captured PII in the raw sensor data, identifying data attributes of the captured PII, generating the simulated PII for the captured PII based on the data attributes using a generative adversarial network, and constructing the processed sensor data including the simulated PII in the base layer replacing the captured PII with the captured PII included in the one or more encrypted additional layers;

receive a request from a client device for a portion of the processed sensor data;

identify access keys corresponding to the request;

construct a result according to the access keys using the processed sensor data; and send the constructed result to the client device responsive to the request.

\* \* \* \* \*